United States Patent [19]

Dorn

[11] Patent Number: 4,482,278
[45] Date of Patent: Nov. 13, 1984

[54] BOLT
[75] Inventor: James D. Dorn, Deerfield, Ill.
[73] Assignee: Brock Manufacturing, Inc., Milford, Ind.
[21] Appl. No.: 486,689
[22] Filed: Apr. 20, 1983
[51] Int. Cl.³ .................................... F16B 39/28
[52] U.S. Cl. .................................................. 411/377
[58] Field of Search ............ 411/377, 373, 371, 187, 411/188, 160, 161, 162, 163, 332, 369, 302

[56] References Cited
U.S. PATENT DOCUMENTS

| | | | |
|---|---|---|---|
| 186,066 | 1/1877 | Swingly . | |
| 442,642 | 12/1890 | Roby . | |
| 516,382 | 3/1894 | Russell et al. . | |
| 529,970 | 11/1894 | Smouse . | |
| 922,191 | 5/1909 | Reynolds . | |
| 957,931 | 5/1910 | Bond . | |
| 997,118 | 7/1911 | Eden . | |
| 1,211,553 | 1/1917 | Dervoz . | |
| 1,409,813 | 3/1922 | Anderson . | |
| 1,692,469 | 11/1928 | Rex . | |
| 1,715,975 | 6/1929 | Angell . | |
| 1,719,136 | 7/1929 | Rosenberg . | |
| 1,867,354 | 7/1932 | Dickson . | |
| 2,074,773 | 3/1937 | Camp et al. . | |
| 2,074,774 | 3/1937 | Camp et al. . | |
| 2,111,796 | 3/1938 | Meader . | |
| 2,400,318 | 5/1946 | Rosan . | |
| 2,527,053 | 10/1950 | Bedford, Jr. . | |
| 2,634,934 | 4/1953 | Martin et al. . | |
| 3,218,656 | 11/1965 | Reiland . | |
| 3,218,905 | 11/1965 | Reiland . | |
| 3,245,449 | 4/1966 | Mitchell . | |
| 3,295,580 | 1/1967 | Waltermire | 411/187 |
| 3,482,481 | 12/1969 | Newell et al. . | |
| 3,530,760 | 9/1970 | Lindstrand . | |
| 3,557,654 | 1/1971 | Weidner, Jr. . | |
| 3,618,444 | 11/1971 | Kay et al. | 411/373 |
| 3,622,167 | 11/1971 | Velthoven | 411/371 X |
| 3,648,560 | 3/1972 | Roser . | |
| 3,693,495 | 9/1972 | Wagner | 411/377 |
| 3,712,357 | 1/1973 | Corbett et al. . | |
| 3,799,229 | 3/1974 | Johnson . | |
| 3,854,372 | 12/1974 | Gutshall . | |
| 3,885,492 | 5/1975 | Gutshall | 411/373 |
| 3,903,784 | 9/1975 | Dekker . | |
| 3,965,793 | 6/1976 | Roser . | |
| 4,104,446 | 8/1978 | Johnson . | |
| 4,129,060 | 12/1978 | Gould . | |
| 4,154,138 | 5/1979 | Melone | 411/373 |
| 4,223,711 | 9/1980 | Tabor | 411/188 |
| 4,231,281 | 11/1980 | Reinwall, Jr. . | |
| 4,235,147 | 11/1980 | Weidner, Jr. . | |
| 4,283,091 | 8/1981 | Enders | 411/160 X |
| 4,316,690 | 2/1982 | Voller . | |

FOREIGN PATENT DOCUMENTS 2398913  3/1979  France ................. 411/373

Primary Examiner—Gary L. Smith
Assistant Examiner—Adrian H. Whitcomb, Jr.
Attorney, Agent, or Firm—Trexler, Bushnell & Wolters, Ltd.

[57] ABSTRACT

An improved bolt which has a head with a plurality of sharp projections extending in the direction of the shank so that the head can bite in and lock the bolt to a workpiece. A second embodiment utilizes a plastic encapsulation over the head, for example, for use with buildings wherein the openings through which the shank passes is to be sealed and in this embodiment the sharp projections cut through the plastic encapsulating material so as to bite into the workpiece and such cuts are spaced so that the edge of the encapsulating material is not completely separated from the main portion of the encapsulating material.

1 Claim, 7 Drawing Figures

U.S. Patent  Nov. 13, 1984  4,482,278
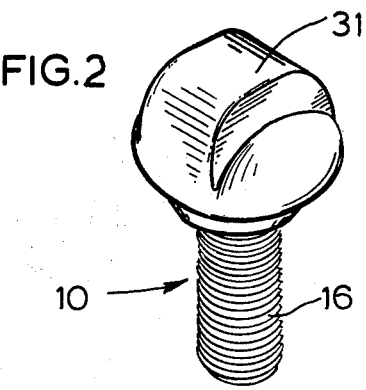
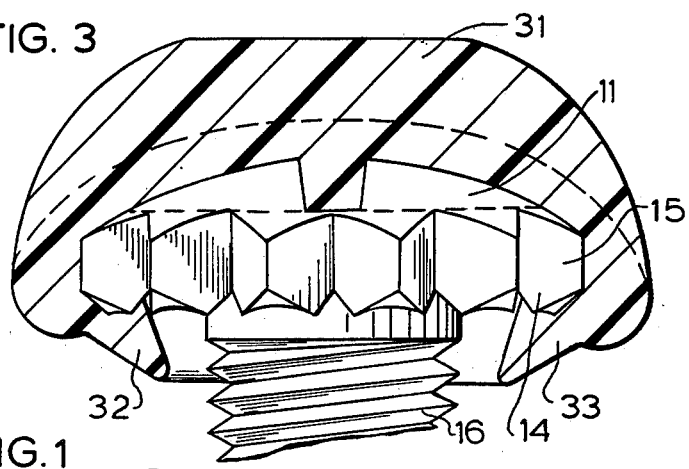
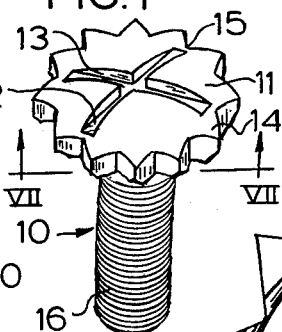
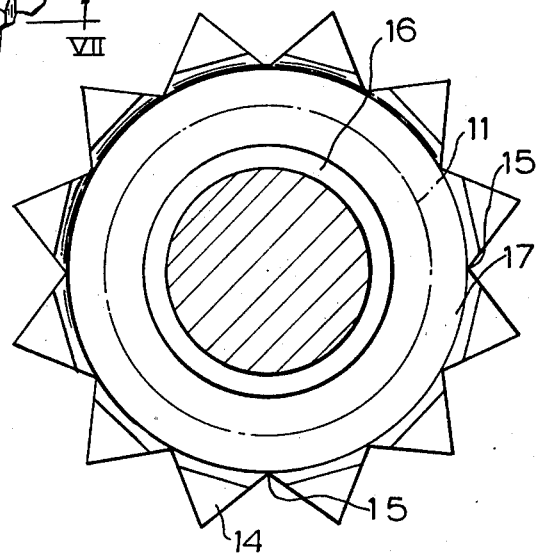
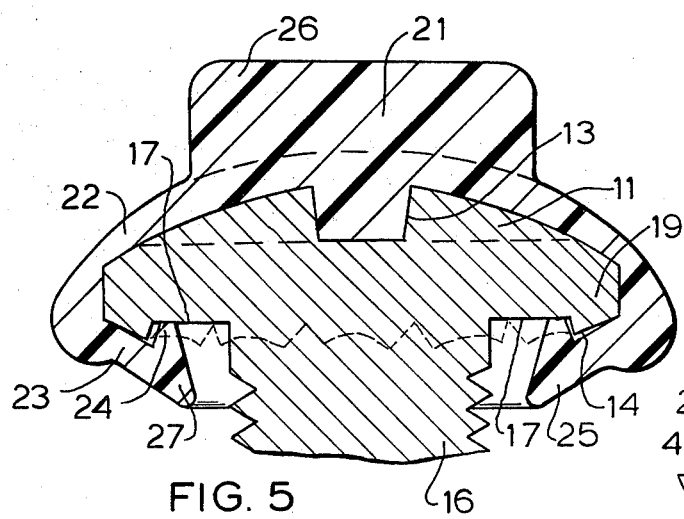
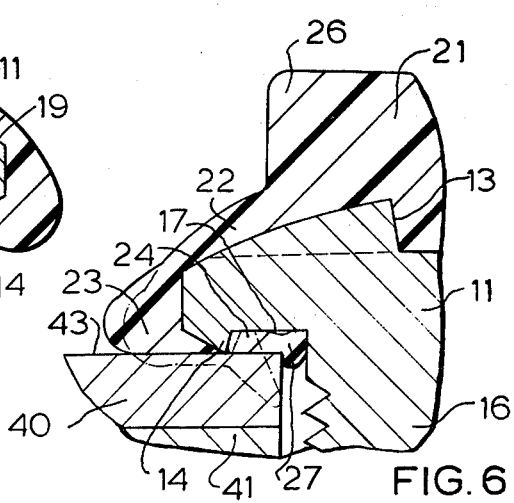

BOLT

BACKGROUND OF THE INVENTION

1. Field of the Invention

This invention relates in general to a fastening means and in particular to an improved bolt.

2. Description of the Prior Art

Bolts with heads coated with encapsulating material are known such as in U.S. Pat. No. 4,316,690 but in such structures the head of the bolt often cuts through the encapsulating material so that the encapsulating material can become separated from the head and also the bolt can be turned relative to the workpiece.

SUMMARY OF THE INVENTION

The present invention comprises an improved bolt having a head in which a plurality of serrations have been formed about its outer surface and a groove has been formed in the undersurface of the head such that the projections and groove form sharp downwardly extending plurality of locking projections which can engage and lock the bolt to a workpiece. Furthermore, when the head is coated with an encapsulating coating, the projections will cut through the encapsulating plastic at selected locations but will not completely cut the plastic into two parts such that the projections will engage the workpiece and lock the head to the workpiece.

Other objects, features and advantages of the invention will be readily apparent from the following description and claims when read in view of the drawings in which:

BRIEF DESCRIPTION OF THE DRAWINGS

FIG. 1 is a perspective view of the bolt of the invention;

FIG. 2 illustrates the improved bolt with an encapsulating coating on the head;

FIG. 3 is a sectional view through the encapsulated head;

FIG. 4 is a sectional view through the bolt mounted in a workpiece;

FIG. 5 is a sectional view through the head;

FIG. 6 is a cut-away sectional view illustrating the bolt engaged with the workpiece; and FIG. 7 is a sectional view taken on lines VII—VII from FIG. 1.

DESCRIPTION OF THE PREFERRED EMBODIMENTS

FIG. 1 illustrates a bolt 10 having a shank 16 and a head 11. Grooves 12 and 13 are formed in the head 11 for holding or turning the bolt with a suitable tool. A plurality of serrations are formed about the outer periphery of the head 11 so as to form a number of projections 15. As shown in FIG. 5, the underside of the head 11 is formed with a groove 17 adjacent the shank 16 and the serrations or projections 15 are formed with downwardly extending portions 14 which extend beyond the groove 17 as shown in FIG. 5.

The head 11 of the invention may be encapsulated with a suitable encapsulating cap 31 as illustrated in FIG. 2. FIG. 3 illustrates a sectional view wherein said encapsulating material 31 extends over the head 11 and has portions 32 and 33 which extend around the serrations 14 and 15 and into the groove 17. FIG. 5 illustrates a different form of the encapsulating cap 21 which is formed with a raised portion 26 and which has a main portion 22 with ends 23 that extend into the groove 17 over the projections 14.

FIG. 7 is a sectional view on line VII—VII from FIG. 1 and illustrates the projections 14, the groove 17 and the head 11.

In use, the bolt 10 may be used without an encapsulating head and in that event the projections 14 bite into the workpiece such as the plate 40 which is formed with a suitable opening through which the shank of the bolt 16 extends. A second workpiece 41 is formed with an aligned opening and the nut 42 is threaded on the shank 16 to lock the pieces 40 and 41 together. If the head 11 is not encapsulated the projections 14 bite into the upper surface 43 of the workpiece 40 so as to prevent the bolt from rotating relative to the workpiece 40 as the nut 42 is tightened.

If the head 11 is enclosed in an encapsulating plastic head 21 or 31 as illustrated in FIGS. 5 and 4, the portions 32 and 33 of portion 31 or the portions 23 and 25 of encapsulating material 21 are deformed as the bolt is tightened in the workpiece 40 and 41. For example, as shown in FIG. 6, as the shank of the bolt is drawn into the workpiece 40 by tightening the nut 42, the projections 14 will cut through the portion 23 of the encapsulating material 21 and the inner ends 27 and 24 will move into the groove 17 as shown in FIG. 6 allowing the projections 14 to cut through the portion 23 and bite into the surface 43 as illustrated in FIG. 6. FIG. 6 illustrates the untightened position of the plastic material 23 in dashed line and the tightened position of the bolt in solid line.

It is seen that this invention provides a novel bolt with an improved head which is formed with a groove and has projections formed by serrations 15 which result in projections 14 that extend in the direction of the shank 16 beneath the main surface of the head 11. These projections 14 bite into the workpiece to prevent the bolt from rotating as a nut is tightened on the shank and if an encapsulating head is placed over the bolt, these projections cut through the encapsulating head in selected locations so as to bite into the workpiece surface.

Although the invention has been described with respect to preferred embodiments, it is not to be so limited as changes and modifications may be made therein which are within the full intended scope as defined by the appended claims.

I claim as my invention:

1. A bolt with a head and shank with a plurality of serrations formed about the periphery of said head, said serrations having the form of substantially equilateral triangles in cross section which extend radially outwardly from said head, a groove formed in the head underside adjacent said shank and extending radially outwardly to but not including the radial extremities of said serrations so as to form projections which extend from said head in the direction of said shank so that said projections will engage and hold the surface of a workpiece as the bolt is tightened against the workpiece, plastic encapsulating material surrounding and covering said head and said serrations for movement therewith, said plastic also being adapted to extend into said groove so that when the bolt is tightened against the workpiece the plastic will move further into said groove and said projections will bite through said plastic and engage said workpiece.

* * * * *